United States Patent
Galbi et al.

(10) Patent No.: US 12,111,775 B2
(45) Date of Patent: Oct. 8, 2024

(54) MEMORY HUB PROVIDING CACHE COHERENCY PROTOCOL SYSTEM METHOD FOR MULTIPLE PROCESSOR SOCKETS COMPRISING MULTIPLE XPUS

(71) Applicant: Intel Corporation, Santa Clara, CA (US)

(72) Inventors: Duane E. Galbi, Wayland, MA (US); Matthew J. Adiletta, Bolton, MA (US); Hugh Wilkinson, Newton, MA (US); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 17/212,722

(22) Filed: Mar. 25, 2021

(65) Prior Publication Data
US 2021/0209035 A1     Jul. 8, 2021

Related U.S. Application Data

(60) Provisional application No. 63/130,672, filed on Dec. 26, 2020.

(51) Int. Cl.
*G06F 13/16* (2006.01)
*G06F 13/40* (2006.01)
*G06F 13/42* (2006.01)

(52) U.S. Cl.
CPC ...... *G06F 13/1621* (2013.01); *G06F 13/1668* (2013.01); *G06F 13/409* (2013.01); *G06F 13/4221* (2013.01)

(58) Field of Classification Search
CPC ............. G06F 13/1621; G06F 13/1668; G06F 13/409; G06F 13/4221
See application file for complete search history.

(56) References Cited

U.S. PATENT DOCUMENTS 6,085,295 A    7/2000   Ekanadham et al.
7,739,677 B1   6/2010   Kekre et al.
(Continued)

FOREIGN PATENT DOCUMENTS

WO    2020190801 A1    9/2020

OTHER PUBLICATIONS

First Office Action for U.S. Appl. No. 16/344,582, Mailed Jul. 22, 2020, 21 pages.

(Continued)

*Primary Examiner* — Tammara R Peyton
(74) *Attorney, Agent, or Firm* — Compass IP Law PC

(57) ABSTRACT

Examples described herein relate to an apparatus that includes at least two processing units and a memory hub coupled to the at least two processing units. In some examples, the memory hub includes a home agent. In some examples, the memory hub is to perform a memory access request involving a memory device, a first processing unit among the at least two processing units is to send the memory access request to the memory hub. In some examples, the first processing unit is to offload at least some but not all home agent operations to the home agent of the memory hub. In some examples, the first processing unit comprises a second home agent and wherein the second home agent is to perform the at least some but not all home agent operations before the offload of at least some but not all home agent operations to the home agent of the memory hub. In some examples, based on provision of the at least some but not all home agent operations to be performed by the second home agent, the second home agent is to perform the at least some but not all home agent operations.

24 Claims, 9 Drawing Sheets

(56) References Cited

U.S. PATENT DOCUMENTS

| | | |
|---|---|---|
| 8,812,765 B2 | 8/2014 | Dai et al. |
| 9,253,055 B2 | 2/2016 | Nelke et al. |
| 10,296,459 B1* | 5/2019 | Jayasimha ............ G06F 12/082 |
| 10,402,330 B2* | 9/2019 | Kumar ................ G06F 12/0824 |
| 2003/0028594 A1 | 2/2003 | Laschkewitsch et al. |
| 2004/0205304 A1 | 10/2004 | McKenney et al. |
| 2006/0168337 A1 | 7/2006 | Stahl et al. |
| 2008/0229318 A1 | 9/2008 | Franke |
| 2009/0198792 A1 | 8/2009 | Wittenschlaeger |
| 2011/0185125 A1 | 7/2011 | Jain et al. |
| 2011/0296231 A1 | 12/2011 | Dake |
| 2012/0303885 A1 | 11/2012 | Jeddeloh |
| 2013/0159638 A1 | 6/2013 | Koinuma et al. |
| 2014/0047272 A1 | 2/2014 | Breternitz et al. |
| 2014/0047341 A1 | 2/2014 | Breternitz et al. |
| 2014/0359044 A1 | 12/2014 | Davis et al. |
| 2015/0261698 A1* | 9/2015 | Zhang ...................... G11C 5/06 711/156 |
| 2015/0381426 A1 | 12/2015 | Roese et al. |
| 2016/0306677 A1 | 10/2016 | Hira et al. |
| 2018/0067857 A1 | 3/2018 | Wang et al. |
| 2018/0150419 A1 | 5/2018 | Steinmacher-Burow |
| 2020/0050497 A1 | 2/2020 | Kumar et al. |
| 2020/0226027 A1 | 7/2020 | Krasner et al. |
| 2021/0209035 A1 | 7/2021 | Galbi et al. |

OTHER PUBLICATIONS

International Search Report and Written Opinion for PCT Patent Application No. PCT/US21/51801, Mailed Jan. 3, 2022, 12 pages.

Notice of Allowance for U.S. Appl. No. 16/344,582, Mailed Jan. 12, 2021, 10 pages.

PCT Search Report and Written Opinion prepared for PCT/US2017/063756, completed Feb. 23, 2018.

"Directory-Based Cache Coherence", Parallel Computer Architecture and Programming, CMU 15-418/15-618, Spring 2019, 56 pages.

Denneman, Frank, "Numa Deep Dive Part 3: Cache Coherency", https://frankdenneman.nl/2016/07/11/numa-deep-dive-part-3-cache-coherency/, Jul. 11, 2016, 14 pages.

Gorman, Mel, et al., "Optimizing Linux for AMD EPYC™ 7002 Series Processors with SUSE Linux Enterprise 15 SP1", SUSE Best Practices, Nov. 2019, 68 pages.

Ronciak, John A., et al., "Page-Flip Technology for use within the Linux Networking Stack", Proceedings of the Linux Symposium, vol. Two, Jul. 2004, 8 pages.

* cited by examiner

MEMORY HUB PROVIDING CACHE COHERENCY PROTOCOL SYSTEM METHOD FOR MULTIPLE PROCESSOR SOCKETS COMPRISING MULTIPLE XPUS

RELATED APPLICATION

This application claims the benefit of priority of U.S. Provisional application 63/130,672, filed Dec. 26, 2020. The contents of that application are incorporated in its entirety herein.

BACKGROUND

As more central processing units (CPUs) are integrated into a package, an increasing number of dynamic random access memory (DRAM) channels are used in order to support high memory capacity and high bandwidth. Increasing the number of DRAM channels per socket may increase the signal bumps used by the CPU package and may increase the cost of the socket package.

FIG. 1 shows a standard dual socket CPU configuration whereby one CPU socket is connected to one memory hub. CPU 102-A can represent a package substrate that includes compute dies and an input output (IO) hub 104-A-1 connected via channels 105-A to two dual in-line memory modules (DIMMs) 106-A-1 per channel (DPC). CPU 102-A can include another IO hub 104-A-2 connected via channels 105-B to other memory devices (e.g., DIMMs) 106-A-2. Similarly, CPU 102-B can represent a package substrate that includes compute dies and an IO hub 104-B-1 connected via channels 105-C to memory 106-B-1. CPU 102-B can include another IO hub 104-B-2 connected via channels 105-D to other memory devices (e.g., DIMMs) 106-B-2.

In this configuration, for CPU 102-B to access memory 106-A-1 or 106-A-2 through interface 108-A or 108-B, the access time to memory 106-A-1 or 106-A-2 attached to CPU 102-A can be roughly 50% higher than the access time to memory 106-B-1 or 106-B-2 attached to CPU 102-B. In some cases, additional access time latency arises because of transaction times involved in traversing a link and overhead involved in communicating with CPU 102-A. For CPU 102-B to access memory connected to CPU 102-A, CPU 102-B requests CPU 102-A to read or write on behalf of CPU 102-B. Added latency can lead to Non-Uniform Memory Access (NUMA) for memories 106-A-1 and 106-A-2 and memories 106-B-1 and 106-B-2 for CPU 102-A and for CPU 102-B.

BRIEF DESCRIPTION OF THE DRAWINGS

FIGS. 2C-1 to 2C-5 depict an example sequence of transfer of access management of an addressable memory region among devices.
FIG. 5 depicts an example system.

DETAILED DESCRIPTION

Various embodiments can provide multiple (e.g., two or more) CPU sockets that connect to a memory hub to access contents of memory devices connected to the memory hub. A memory channel can include a link or connection with a memory device through which data or commands are transferred. One or multiple channels (e.g., single, dual, quad, and so forth) can be used between a memory device and a memory hub. To share access to the memory via the memory hub among the multiple CPU sockets, home agent circuitry could be incorporated in the memory hub to manage cache coherency for multiple CPU sockets. In order to increase the number of memory channels available to the CPUs, a CPU socket can be connected to multiple memory-hubs and potentially provide approximately uniform access times to and from multiple memory channels. Various embodiments can enable multi-socket unified memory architecture (UMA) domain support for any number of memory devices without increasing a number of DRAM channels connection interfaces (e.g., conductive bumps, ball grids) in a CPU socket package.

Figure 2A:
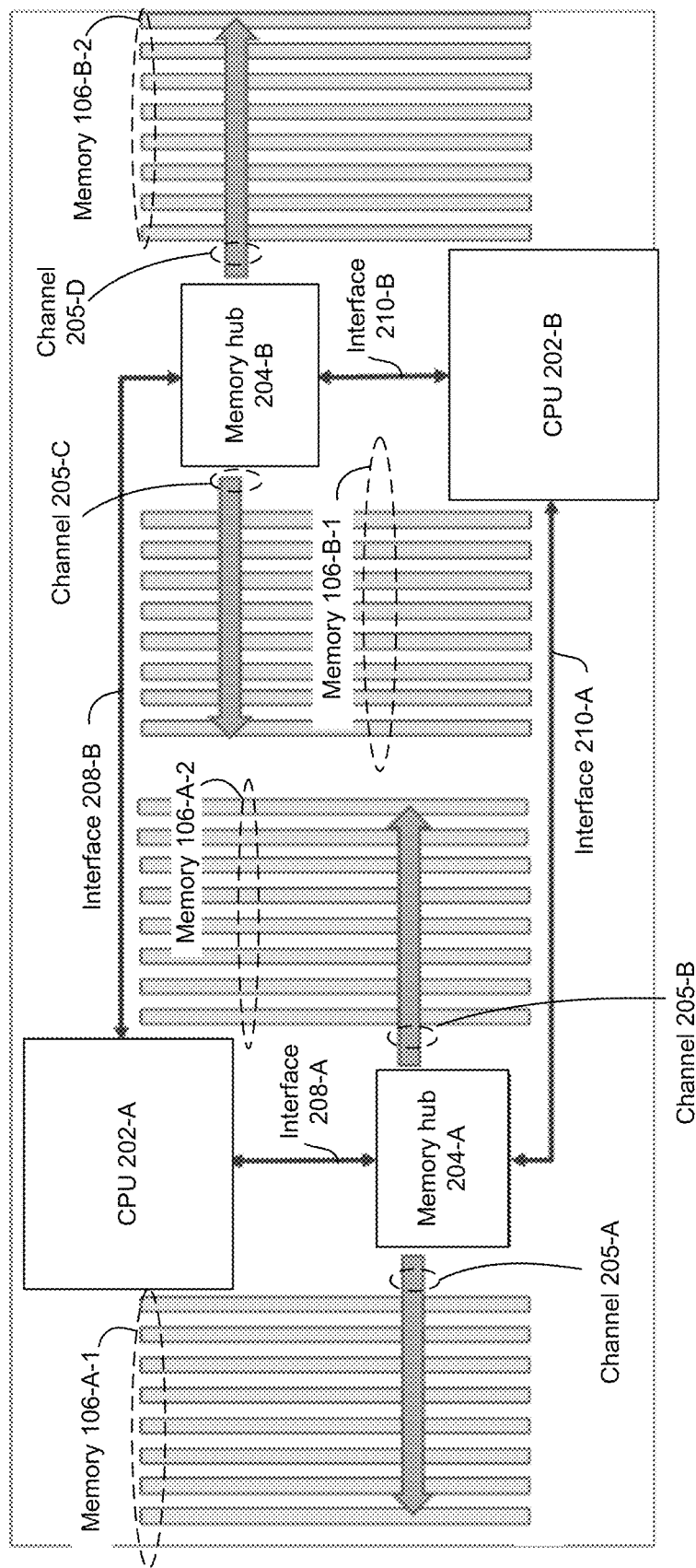
FIG. 2A depicts an example system.

FIG. 2A shows a system that provides access to multiple memory devices using a memory hub. In some examples, a CPU (or XPU) socket can be connected to one or more memory hubs and one or more memory hubs can provide the CPU access to one or more memory devices. In some examples, CPU socket 202-A or 202-B can include one or more compute dies, one or more processors, one or more cores, one or more input/output (IO) hubs, and one or more caching agents (CAs). For example, one or more processors can include one or more of: a central processing unit (CPU) core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. A CPU socket can include a connector to a motherboard or circuit board that includes a CPU and provides an electrical interface with the CPU. While description is provided with respect to a CPU, embodiments can be utilized for XPUs, where an XPU can include one or more of: a CPU, a graphics processing unit (GPU), general purpose GPU (GPGPU), and/or other processing units (e.g., accelerators or programmable or fixed function FPGAs). For example, an XPU could be a device with a CPU, GPU, a cryptographic accelerator, and/or an inference engine.

For example, CPU socket 202-A can be coupled to memory hub 204-A and memory hub 204-B using respective interfaces 208-A and 208-B. Similarly, CPU 202-B can be coupled to memory hub 204-A and memory hub 204-B using respective interfaces 210-A and 210-B. Interfaces 208-A, 208-B, 210-A, and 210-B can provide communicative coupling in a manner consistent with one or more of: Peripheral Component Interconnect express (PCIe) (e.g., Peripheral Component Interconnect (PCI) Express Base Specification 1.0 (2002), as well as earlier versions, later versions, and variations thereof), Intel QuickPath Interconnect (QPI), Intel Ultra Path Interconnect (UPI), Intel On-Chip System Fabric (IOSF), Omnipath, Compute Express Link (CXL) (e.g., Compute Express Link Specification revision 2.0, version 0.7 (2019), as well as earlier versions, later versions, and variations thereof), HyperTransport, NVLink, Advanced Microcontroller Bus Architecture (AMBA) interconnect, OpenCAPI, Gen-Z, Cache Coherent Interconnect for Accelerators (CCIX), or Infinity Fabric (IF).

In some examples, one or more of interfaces 208-A, 208-B, 210-A, and 210-B can provide parallel communication links or one or more serial communication links. In some examples, a bit transfer rate from a memory hub to a CPU socket can be at least as fast as a sum of maximum bit transfer rates from all memory devices connected to the memory hub to the memory hub or N times a maximum bit transfer rate from all memory devices connected to the memory hub to the memory hub, where N is an integer. In some examples, a bit transfer rate of one or more of interfaces 208-A, 208-B, 210-A, and 210-B can be equal to or higher than a total bit transfer rate of memory channels between a memory hub and all memory devices connected to the memory hub to provide sufficient bandwidth support of data transfer to and from all memories connected to the memory hub. Accordingly, a bit transmission rate from a CPU to a memory hub and/or a bit receive rate to a CPU from a memory hub can be at least as high as a sum of all transfer rates from one or more connected memory devices to the memory hub and from the memory hub to the one or more connected memory devices. In some examples, the transmission rate from the CPU to the memory hub can be less than a sum of all transfer rates from the memory hub to the one or more connected memory devices. In some examples, the receive rate at the CPU from the memory hub can be less than a sum of all transfer rates from one or more connected memory devices to the memory hub.

Memory hub 204-A can be connected to memory 106-A-1 using one or more dynamic random access memory (DRAM) channels 205-A. Similarly, memory hub 204-A can be connected to memory 106-A-2 using one or more DRAM channels 205-B. Likewise, memory hub 204-B can be connected to memory 106-B-1 using one or more DRAM channels 205-C and to memory 106-B-2 using one or more DRAM channels 205-D. For example, a DRAM channel can provide a read or write to a DIMM independent from another DRAM channel such that multiple DRAM channels can be used to access (e.g., read or write) different DIMMs to read or write multiple data in a clock cycle. Any number of channels per memory hub and number of DIMMs per channel can be used. For example, one, two, four, eight, or twelve channels per memory-hub can be used. For example, a single DIMM per channel can be supported.

Figure 1:
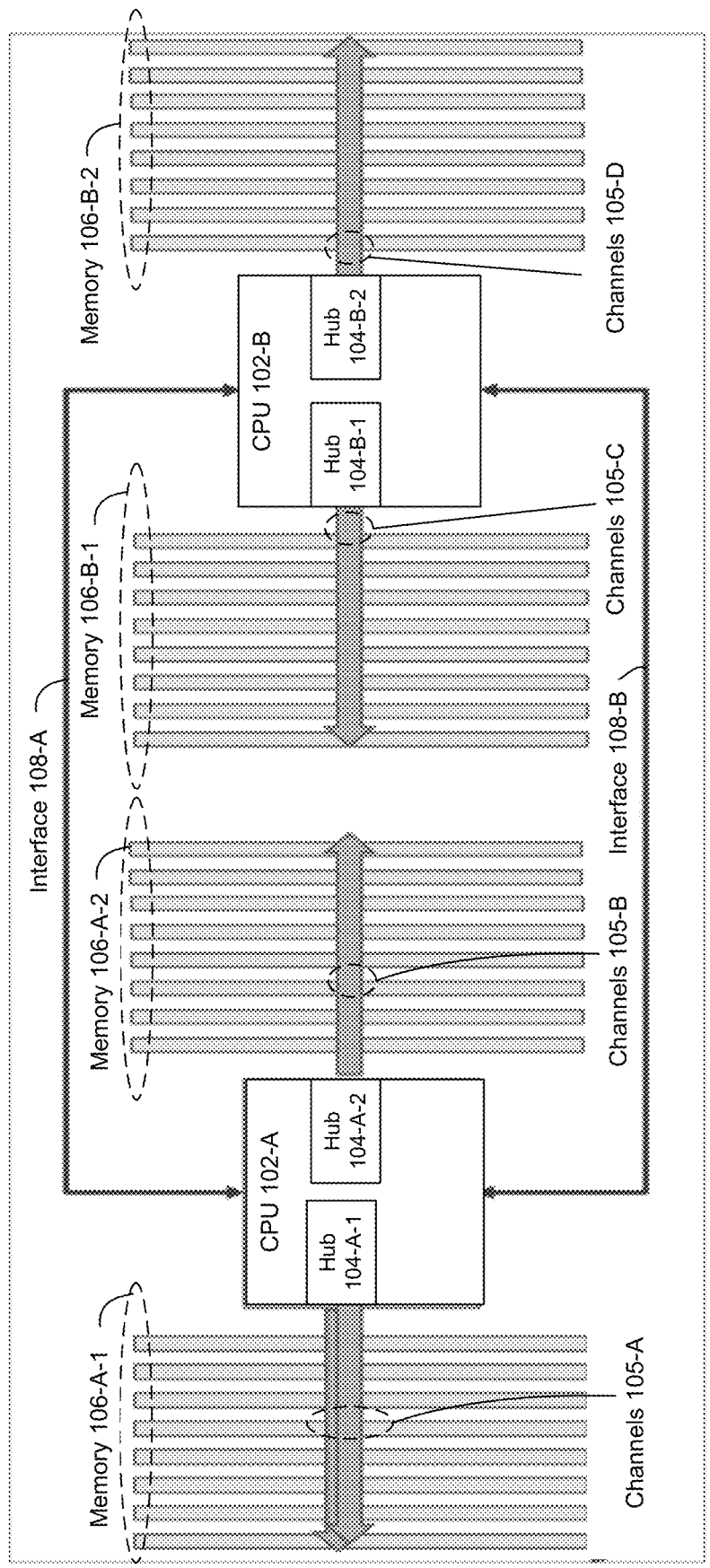
FIG. 1 shows an example CPU socket and memory device configuration.

In some examples, memory hub 204-A can provide coupling of CPU socket 202-A and CPU socket 202-B to multiple memory devices (e.g., memory 106-A-1 and 106-A-2). Similarly, memory hub 204-B can provide coupling of CPU socket 202-A and CPU socket 202-B to multiple memory devices (e.g., memory 106-B-1 and 106-B-2). For example, a memory hub (e.g., memory hub 204-A and/or 204-B) can provide a switching network to communicatively couple a CPU socket to one or more memory devices. Use of a memory hub connected using an interface (e.g., serial or parallel link) to a CPU socket can provide a faster access time to the CPU socket than if the CPU socket requests a data read or write involving another CPU socket. For example, memory hub 204-A can provide faster access to memory 106-A-1 or 106-A-2 to CPU socket 202-B than CPU socket 202-B requesting data from memory 106-A-1 or 106-A-2 via CPU socket 202-A as in the configuration of FIG. 1 at least because CPU-to-CPU requests for data can increase data access time. Similarly, memory hub 204-B can provide faster to access to memory 106-B-1 or 106-B-2 to CPU socket 202-A than CPU socket 202-A requesting data from memory 106-B-1 or 106-B-2 via CPU socket 202-B as in the configuration of FIG. 1. Note that CPU socket 202-A and/or CPU socket 202-B can utilize their own direct attached memory as in the example of FIG. 1 using a memory channel or interface so that a CPU socket can access a memory device directly and without use of a memory hub.

In some examples, the access time to memory devices connected through memory hub 204-A and memory hub 204-B can be similar for both CPU sockets 202-A and 202-B. In some examples, multiple (e.g., two or more) CPU sockets could connect to one or more memory hubs to potentially increase a size of a uniform memory access (UMA) domain and provide approximately same read or write times to a CPU socket using different memory devices. Increasing a number of channels available to a CPU using a memory hub can increase available memory bandwidth and available memory capacity in a UMA domain. In addition, a cost of a CPU socket can be potentially reduced because the CPU socket may not need to directly contain the connection bumps to connect to all memory channels of memory devices in the UMA domain.

In some examples, memory hub 204-A or 204-B can include a memory-side cache that caches data in a particular addressable memory region of a memory device for lower data read or write times as compared to accessing the memory device to read from or write to the addressable memory region. A memory hub could also be connected to pooled memory via fabric interface or network interface or connected to storage such as persistent memory, or other higher latency storage devices.

In some examples, a memory hub could be integrated into the same package with a CPU socket and the in-package connection of the CPU to this memory hub could utilize a high-speed serial or a parallel I/O interface such as interface 208-A, 208-B, 210-A, or 210-B. In some examples, a memory hub could be part of a separate package from a package of a CPU socket.

Figure 2B:
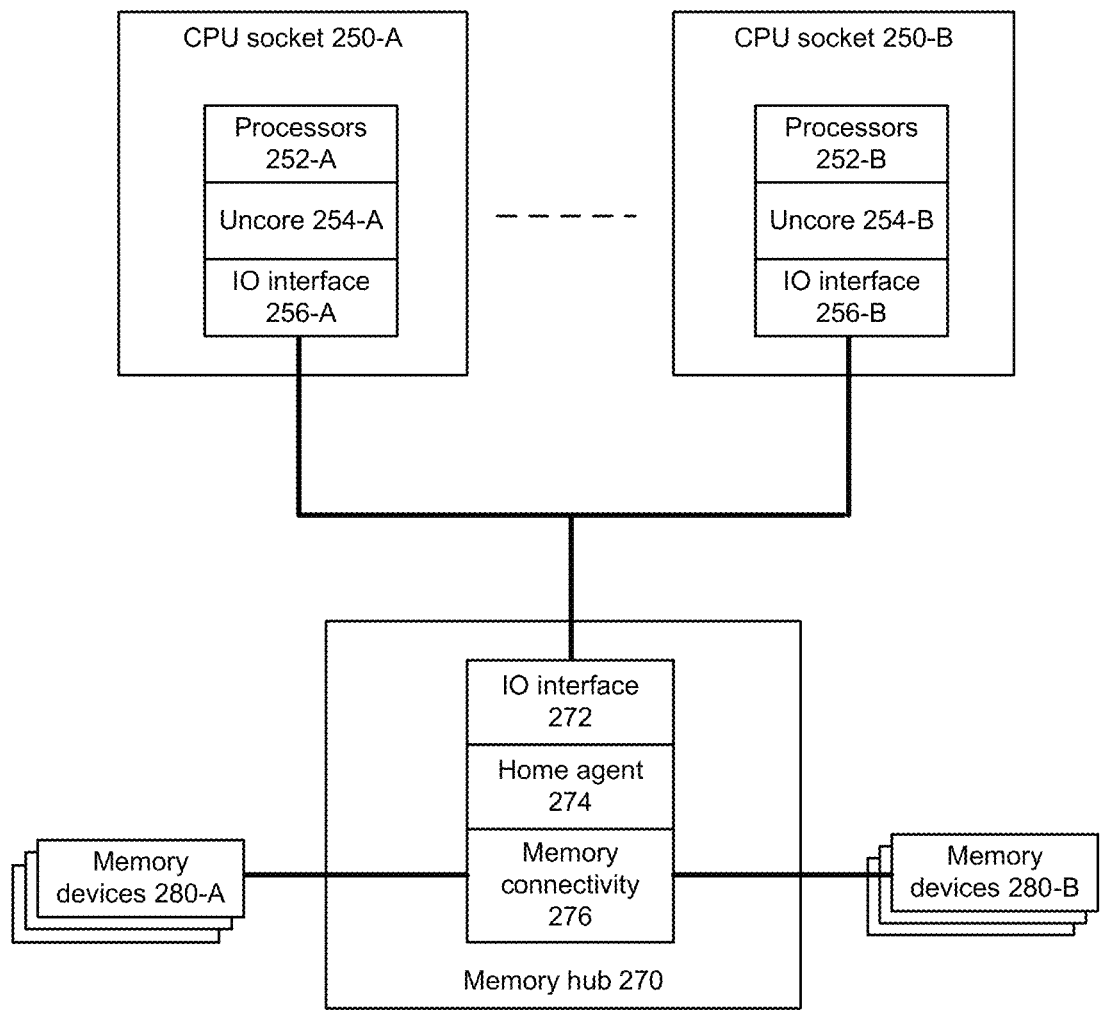
FIG. 2B depicts an example system.
Figures 1, 2C:
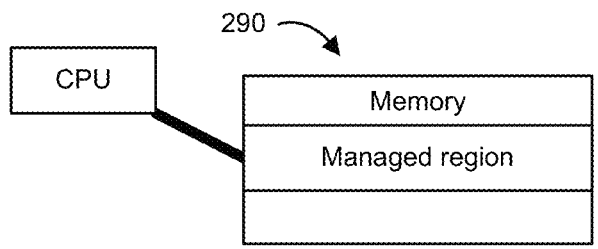
Figures 2, 2C:
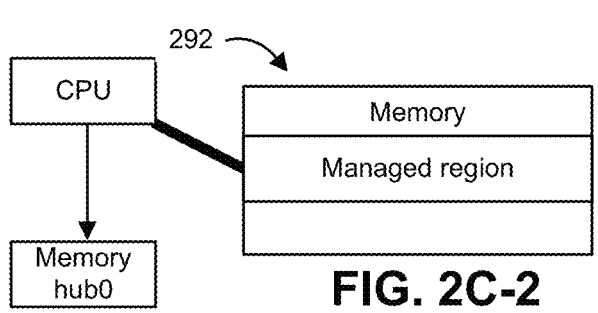
Figures 2, 2C, 3:
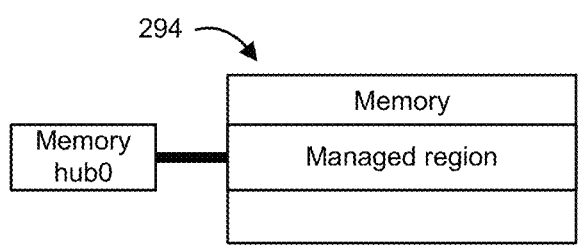
Figures 2, 2C, 3, 4:
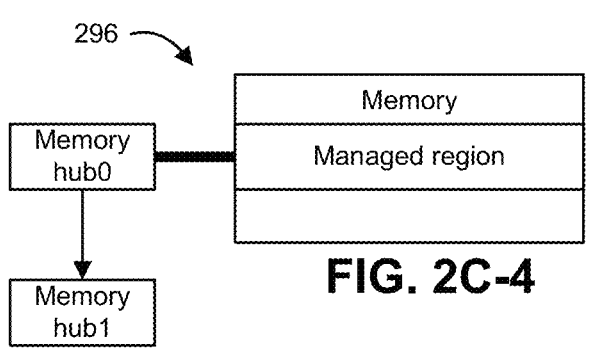

FIG. 2B depicts an example of a system with multiple CPU sockets, a memory hub, and memory devices. Any number of CPU sockets, memory hubs, and memory devices can be used. Note that reference to CPU socket 250, processors 252, uncore 254, and IO interface 256 can refer to one or more of CPU socket 250-A or B, processors 252-A or B, uncore 254-A or B, and IO interface 256-A or B. Various examples of processors 252 are described herein and include a CPU or XPU. For example, CPU socket 250 can include at least: one or more processors 252, an uncore 254, and an input output (IO) interface 256. In some examples, uncore (e.g., system agent) 254 can include or more of: a memory controller, a shared cache (e.g., last level cache (LLC)), a cache coherency manager, Caching Agent (CA), Home Agent (HA), arithmetic logic units, floating point units, core or processor interconnects, or bus or link controllers.

In some examples, memory hub 270 can include at least: an input output (IO) interface 272, home agent 274, and memory connectivity 276. In some examples, IO interface 272 can provide communication with IO interfaces 256-A and 256-B of respective CPU sockets 250-A and 250-B in accordance with applicable standards or specifications.

In some examples, CPU socket 250-A and/or 250-B can offload one or more home agent (HA) operations to memory hub 270 to attempt to achieve data coherency so that a processor in a CPU socket 250 receives a most up-to-date copy of content of a cache line that is to be modified by the processor. In some examples, memory hub 270 can include a home agent (HA) that attempts to provide data coherency among a cache device of CPU socket 250, cache devices of one or more other CPU sockets, and one or more memory devices (e.g., memory devices 280-A and 280-B). In some examples, for particular addressable memory ranges accessible to particular CPU sockets, HA can attempt to achieve data consistency among the memory devices and caches of CPU sockets connected to memory hub 270. In some examples, a single HA of a memory hub is responsible for tracking state changes to one or more cache lines. In some examples, HA 274 in memory hub 270 could be responsible for tracking access to content of cacheable lines that were stored in memory devices communicatively connected to memory hub 270 and in cache and memory devices coupled to other CPU socket(s).

In some examples, offloading of one or more HA operations to memory hub 270 can occur by configuration commands from an administrator, orchestrator, CPU socket 250, or other trusted entity (e.g., baseboard management controller (BMC)). For example, offload of one or more HA operations to memory hub 270 can include disabling the one or more HA operations on CPU socket 250 and enabling the one or more HA operations on memory hub 270. For example, the configuration commands can be sent as a write or read request from a particular memory address range, a write to a register, an indication in a packet header or payload, or other manners.

The following provides an example operation of use of HA 274 by CPU socket 250-A. In connection with an access to a cache line by a core of CPU socket 250-A, CPU socket 250-A's caching agent (CA) of uncore 254-A can attempt to determine whether another core or processor in CPU socket 250-A has access to the same cache line and corresponding memory address to determine cache coherency. Where another core or processor in CPU socket 250-A has access to the same cache line and corresponding memory address, the CA of CPU socket 250-A can provide data from its cache slice or obtain a copy of data from another core's cache in CPU socket 250-A. The CA of CPU socket 250-A can forward a request for cache line data to one or more memory hubs, including memory hub 270, where the one or more memory hubs are connected to CPU socket 250-A whose CA originated the request. In this example, one memory hub is depicted, but more than one memory hub can be used. The CA of CPU socket 250-A can request home agent 274 to determine if another CPU socket (e.g., CPU socket 250-B) accessed or changed one or more cache lines. HA 274 of memory hub 270 can provide data from a memory device (e.g., memory devices 280-A or 280-B) to the CA of CPU socket 250-A and/or send snoop requests to other CAs of other CPU sockets that can access the same regions of memory as that of CPU socket 250-A. For example, a snoop request can include a determination of whether another device or process has altered data that is to be processed from a cache in order to obtain a current copy of the data. Any snooping protocol can be used. For example, if another CA manages a copy of content of the cache line in one or more of modified, exclusive, or forward states, a copy of content the cache line can be provided to the requester CA in CPU socket 250-A directly or via HA 274. In some examples, for cache coherency operations, memory hub 270 can snoop one or more other memory hubs or caching agents of one or more CPU sockets.

For example, a CA of CPU socket 250-B can inform HA 274 of memory hub 270 if content of the cache line has been modified or a state of the cache line has been modified. For example, an indication content of the cache line has been modified or a state of the cache line has been modified can include changing cache line state from invalid to shared or exclusive, from exclusive modified to shared or invalid mandatory, or from shared to exclusive mandatory. In some examples, the CA of CPU socket 250-A and/or a CA of another CPU socket (e.g., CPU socket 250-B) can inform HA 274 if a content of the cache line has been modified or a state of the cache line has been modified (e.g., the cache line state changes from shared to invalid or exclusive unmodified to invalid). In response, HA 274 can update a current state of the cache line based on the updated cache line state from one or more CAs to determine from which CPU socket (e.g., CPU socket 250-B) to request cache line content modifications.

In some examples, a region or window of cache line addresses can be shared among multiple dual processor (DP) sockets connected to memory hub 270 and memory connectivity 276 can attempt to achieve consistency across a distributed DP socket cache and memory (e.g., local memory or memory pool).

In some examples, memory connectivity circuitry 276 can manage one or more coherency domains. For example, multiple CPU socket systems can access some but not all memory addresses associated with memory devices connected to memory hub 270. In some examples, memory connectivity circuitry 276 can define a coherent memory domain among CPU sockets or among cores within a CPU socket and limit addresses that are accessible to any core or CPU socket directly through memory hub 270. In a coherency domain, access to a range of memory addresses can be shared by certain cores in a CPU socket or certain CPU socket(s). In another coherency domain, other ranges of addresses can be shared by some, but not all, cores or some, but not all, CPU sockets whereas some ranges of addresses can be shared among CPU sockets connected to memory hub 270. For example, for a memory address range, memory connectivity circuitry 276 can permit a subset of CPU sockets to access data (e.g., read or write) in that address range. Memory connectivity circuitry 276 can define partially overlapping coherency domains allowing independent CPU socket systems to access data though a shared region of memory among the memory devices. In some examples, memory hub 270 can provide a CPU socket or one or more cores with exclusive access to an addressable region of memory in a memory device connected to memory hub 270. In some examples, an orchestrator can inform a baseboard management controller (BMC) or other trusted entity to configure memory connectivity 276 to allocate addressable regions of memory to be accessible by particular sockets.

HA 274 of memory hub 270 can perform snoop operations to one or more CPU sockets that are part of a coherency domain and permitted to access data in addressable memory to attempt to provide data coherency. For example, if a cache line is shared among CPU sockets 250-A and 250-B, memory hub 270 can send snoop request to CPU sockets 250-A and 250-B. For example, if CPU sockets 1-4 can access memory devices connected to a memory hub and a cache line is shared among CPU sockets 1-3, memory hub 270 can send snoop request to just sockets 1-3 and not socket 4. Accordingly, use of a coherency domain can provide a limit on what CPU sockets memory hub 270 issues snoop requests to instead of sending snoop requests to more CPU sockets than in a coherency domain.

Memory connectivity 276 can perform operations of a memory controller to provide CPU socket 250-A and/or 250-B with read or write access to memory devices 280-A and/or 280-B in accordance with applicable memory device standards. In some examples, memory connectivity 276 can be configured to regulate quality of service (QoS) whereby for multiple requests, memory connectivity 276 can apply QoS per requester to manage data read or write rates or prioritization per requester. A requester can include a virtual machine (VM), container, microservice, and so forth running in one or different CPU sockets. In some examples, a requester can include a CPU socket or core in a CPU socket.

In some examples, memory hub 270 can include a CA to flexibly divide available cache among the DRAM channels or among the requesting agents. Use of a CA in memory hub 270 can lower access time to memory devices and increase bandwidth to and from memory devices attached to memory hub 270.

Various embodiments provide for a first device with the capability to transfer access management to an addressable region of memory (e.g., a memory address range) to another device. In some examples, the first device includes a CPU socket or a memory hub whereas the another device includes another CPU socket or another memory hub. In some examples, access management can include ability to perform memory access operations (e.g., read or write) where a source of the memory access operation is another device. For example, access management can include access to a valid page table and its page table entries (PTE) used to translate virtual addresses to physical addresses. In some examples, access management can include a configuration that a device is able to write to and/or read from one or more particular memory addresses. In some examples, access management can include cache coherency operations on behalf of another device.

In some examples, configuration of which device can manage access to an addressable region of memory (e.g., regions of memory corresponding to one or more memory addresses) can be made by a memory manager. A memory manager can include one or more of: an administrator, an orchestrator, other trusted entity such as a baseboard management controller (BMC) or other processor that can manage operations of a platform, server, or group of servers, a CPU, and/or a memory hub. In some examples, a command to a device to perform management of access to an addressable region of memory can be made using a communication from the memory manager. In some examples, the communication can be made in address bits associated with a memory write or read operation to signify that a receiver device is to commence with managing an addressable region of memory. In such examples, another communication can be made in address bits associated with a memory write or read operation to signify that a second receiver device is to cease with managing an addressable region of memory. The receiver device that is to cease performing management of access to an addressable region of memory can have its page table invalidated so that the target device is not able to perform address translations. The second receiver device can be configured with a valid page table and page table entries to perform address translation for received memory transactions. In other words, a "page flipping" operation can be performed to transfer access to one or more memory region by transferring a valid page table to a second receiver device. Communications can be made without using address bits such as by writing to a device register, writing to a region of memory associated with enabling or disabling memory management operations, or other manners. An out-of-band channel can be used to enable or disable memory management operations. This change of page ownership operation can be utilized in data migration (e.g., VM, container, or microservice migration or deployment) or to accelerate or replace data copy operations.

FIGS. 2C-1 to 2C-5 depict an example sequence of transfer of access management of an addressable memory region among devices. In scenario 290, a CPU socket performs access management for a managed region of one or more memory addresses. In scenario 292, using various embodiments described herein, the CPU socket transfers access management to memory hub0. In scenario 294, memory hub0 performs access management for the managed region. In scenario 296, using various embodiments described herein, memory hub0 transfers access management to memory hub 1. In scenario 298, memory hub 1 performs access management for the managed region. Thereafter, memory hub 1 can transfer access management to the CPU socket or another CPU socket or another memory hub.

Figure 3A:
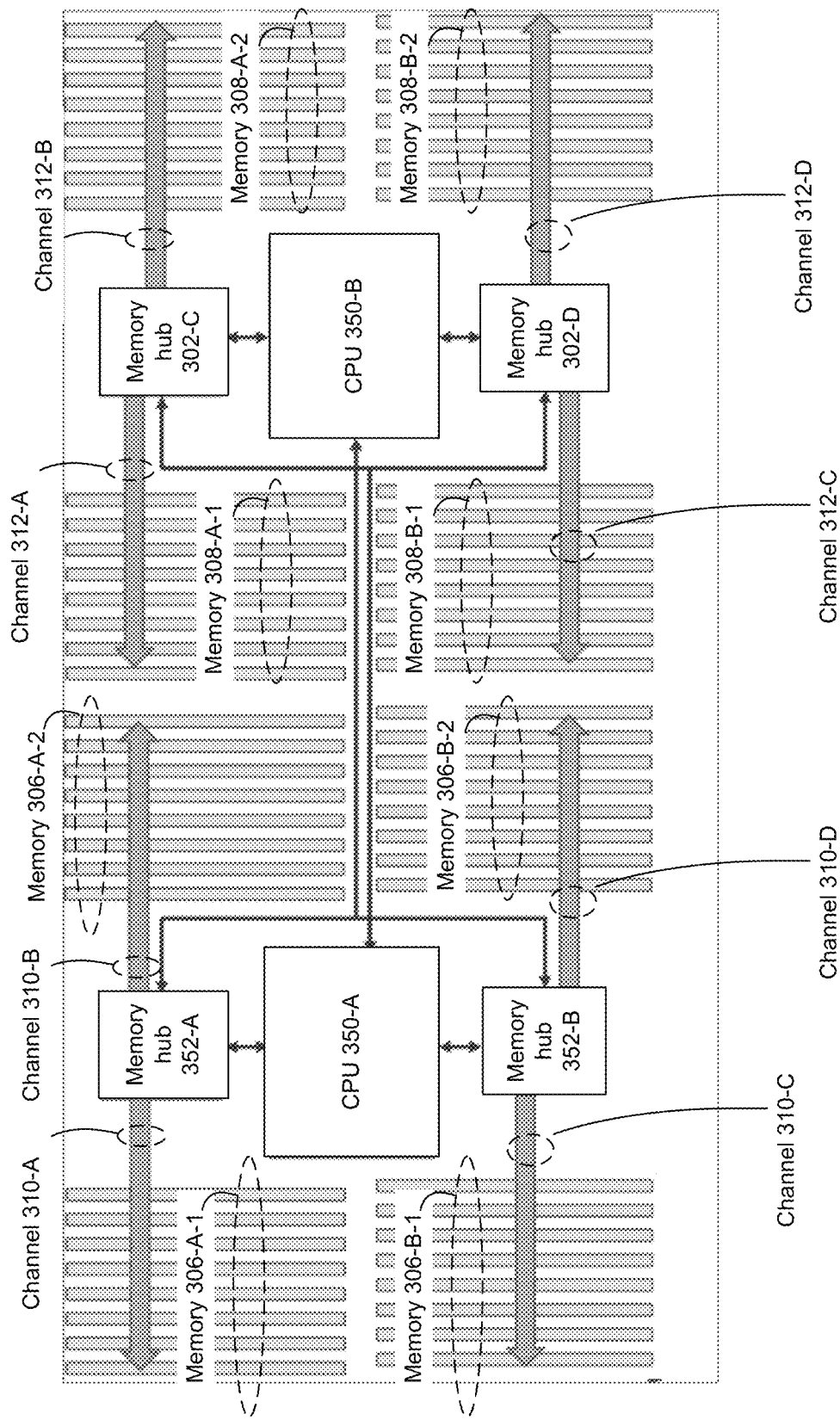
FIG. 3A depicts an example system.

FIG. 3A shows a dual socket CPU configuration that uses two memory-hubs per CPU socket. In this configuration, CPU 350-A can access memory devices 306-A-1, 306-A-2, 306-B-1, and 306-B-2 through memory hubs 352-A and 352-B via respective channels 310-A to 310-D. CPU 350-B can access memory devices 308-A-1, 308-A-2, 308-B-1, and 308-B-2 through multiple memory hubs 352-C and 352-D via respective channels 312-A to 312-D. In some examples, CPU sockets 350-A and 350-B can be connected to respective memory hubs 352-A and 352-B using board traces or electrical or optical signal carrying cables in accordance with signal propagation technologies described herein. Use of multiple memory hubs per CPU socket can increase a number of memory channels available to a CPU socket, increase a size of UMA domain available to a CPU docket and also allow for signal bumps for a memory channel to be included in a memory hub and outside of a CPU socket. Any number of channels per memory hub can be used (e.g., one, two, four, eight, twelve).

Figure 3B:
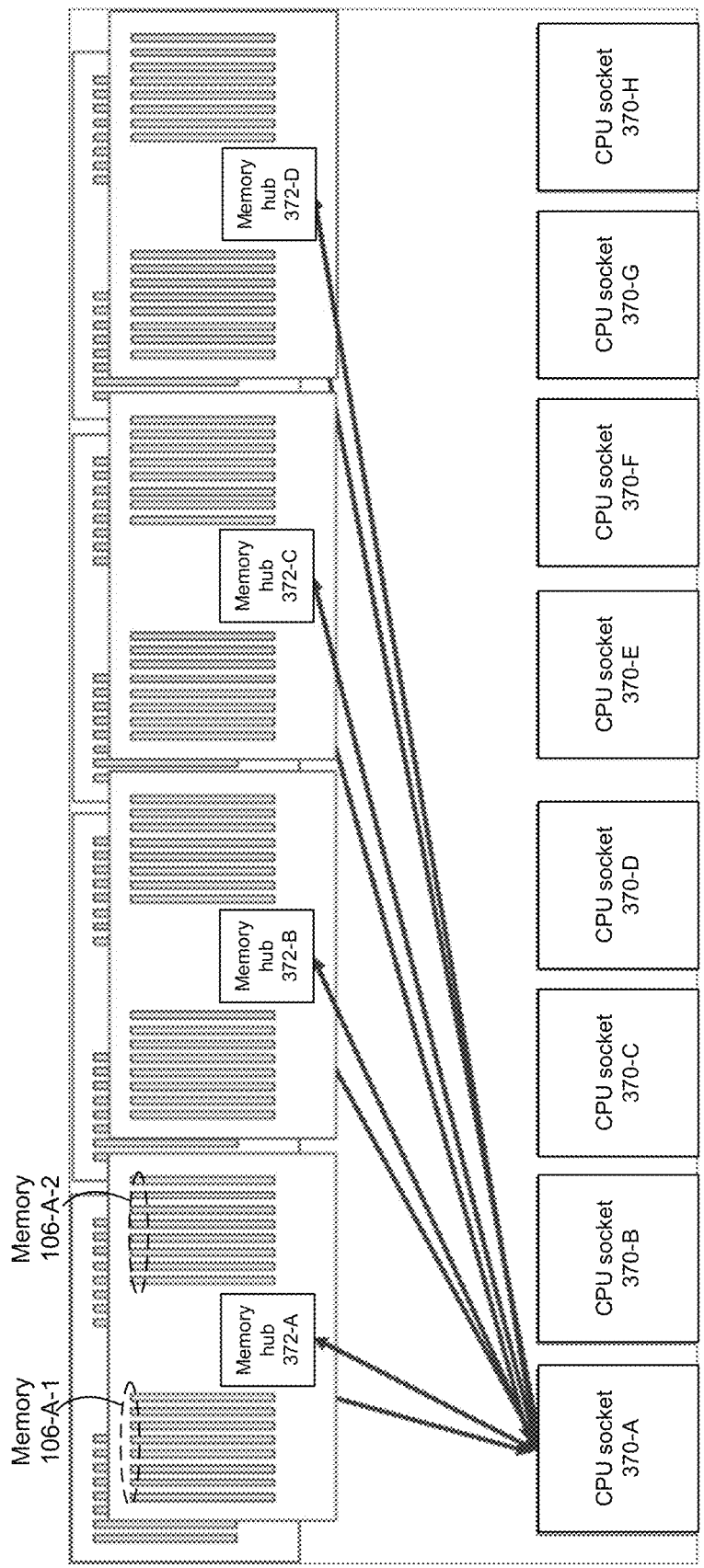
FIG. 3B depicts an example system.

FIG. 3B shows an example with CPU sockets connected to multiple different memory hubs. In this example, each CPU socket is connected to eight different memory hubs, although any number of sockets can be connected to any number of memory hubs. In some examples, a memory hub and memory devices can be communicatively coupled together using traces on a circuit board. For the sake of clarity, merely CPU socket 370-A is shown as connected to multiple memory hubs including memory hubs 372-A to 372-D (visible) and memory hubs 372-E to 372-H (shown behind memory hubs 372-A to 372-D), but one or more of CPU sockets 370-B to 370-H can be connected to one or more of memory hubs 372-A to 372-H. One or more of CPU sockets 370-A to 370-H could be connected to one or more memory hubs 372-A to 372-H using an optical link or cable (e.g., coaxial). In some examples, the serial link may not be routed on the CPU board but routed using a wire bundle. Electrical or optical links could be used to increase the distance signals could travel while keeping latency through the communication medium low enough to allow an increase in a distance or radix with higher number of connections. Such configuration can increase a size of UMA available to one or more CPU sockets.

Figure 4A:
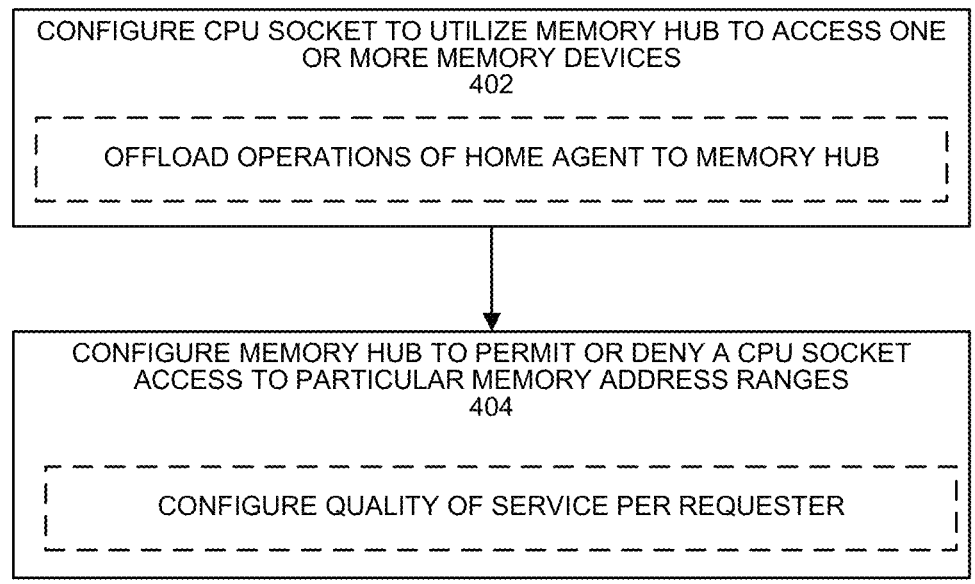
FIGS. 4A and 4B depict example processes.

FIG. 4A depicts an example process for a CPU socket to utilize a memory hub to provide access to one or more memory devices. At 402, a CPU socket can be configured to utilize one or more memory hubs to provide access to one or more memory devices. In some examples, operations of a home agent can be offloaded from the CPU socket to the one or more memory hubs. For example, the home agent of the memory hub can determine if another CPU socket has accessed and changed one or more cache lines identified in a snoop operation by a CA of a CPU socket and provide a most current copy of content of the cache line to the requesting CPU socket or indicate to the requesting CPU socket that the one or more cache lines are unmodified. In some examples, a driver executed by a core of a CPU socket can enable use of memory hub to provide memory access operations and home agent capabilities. In some examples, an uncore or system agent of a CPU socket can enable use of memory hub to provide memory access operations and home agent capabilities.

At 404, the memory hub can be configured to identify particular addressable ranges of memory that a CPU socket is able to access. For example, the memory hub can be configured to identify whether a memory access request by a particular CPU is permitted to be performed. In some examples, the memory hub can be configured to apply quality of service (QoS) for memory access (e.g., read or write) requests from one or more cores, one or more CPU sockets, or one or more software (e.g., VMs, containers, or microservices). For example, memory access requests or cache line-related consistency requests from certain cores, CPU sockets, or software can have higher QoS than requests from other cores, CPU sockets, or software.

Figure 4B:
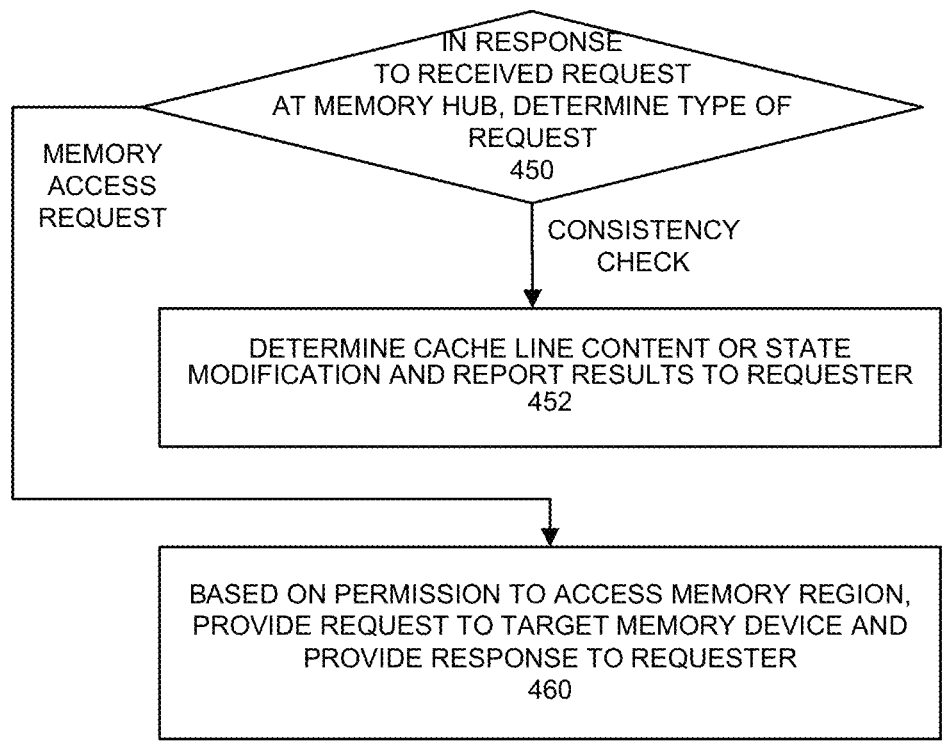
Figure 5:
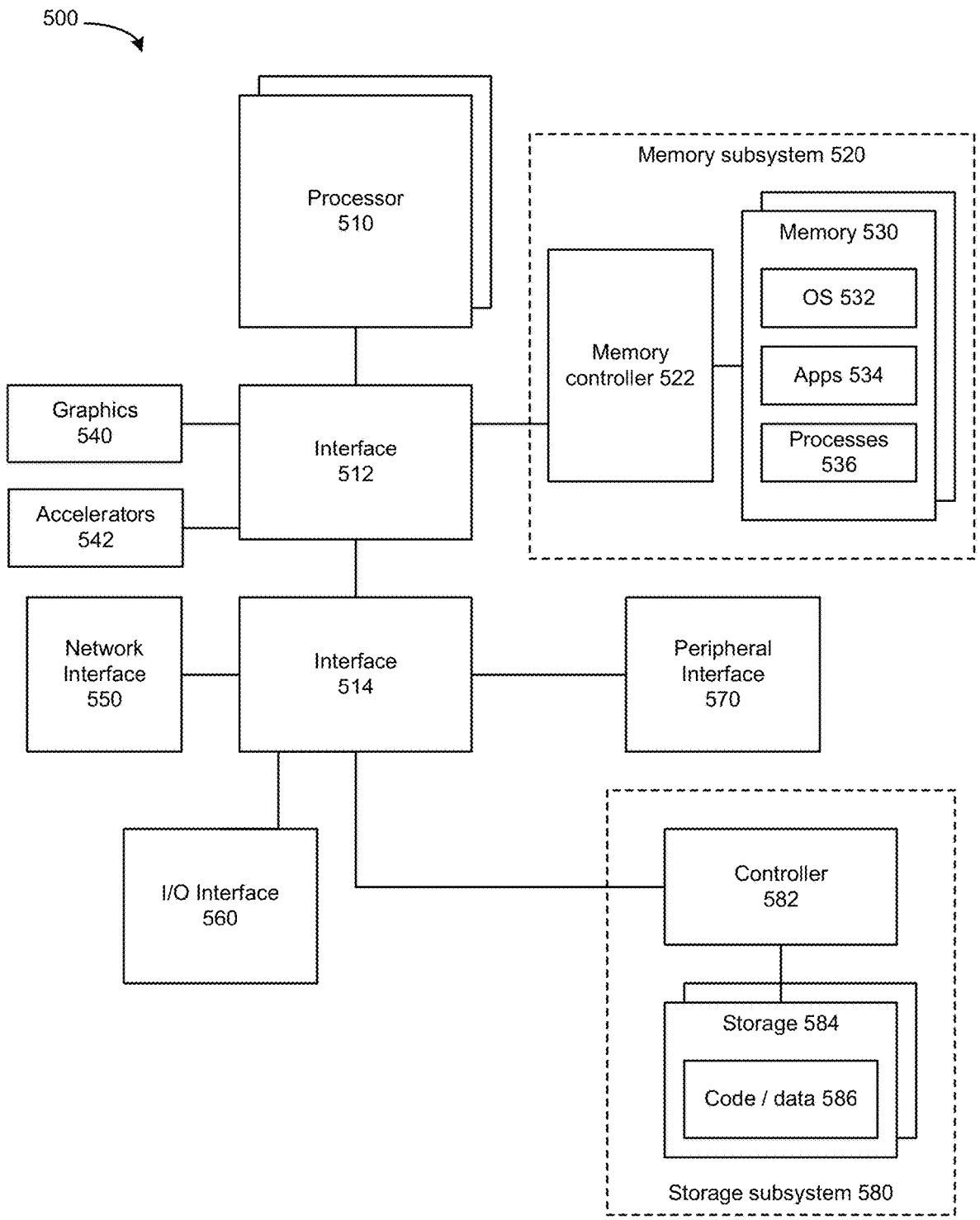

FIG. 4B depicts an example process that can be performed by the memory hub at least in response to a memory access request. At 450, based on receipt of a request from a CPU socket, the memory hub can determine a type of received request. For example, a request from a CPU can include at least: a memory read, memory write, or cache line access request. If the received request is a cache line access request such as a data consistency check from a caching agent of a CPU socket, the process can continue to 452. If the received request is a request to read or write memory address in a memory device, the process can continue to 460.

At 452, the memory hub can determine if content of a cache line has been modified by one or more CPU sockets other than that which requested the data consistency request. For example, a home agent of the memory hub can issue one or snoop requests to one or more caching agents of CPU sockets to determine if one or more other CPU socket modified data associated with a cache line. The memory hub can respond to the requester of a data consistency check by providing a latest copy of the data associated with a cache line(s) or indicating that there has been no modification to data associated with a cache line(s).

At 460, the memory hub can access the memory device associated with the memory access request and perform the memory access request, such as a read or write operation. In some examples, the memory hub can perform a coherence access check to determine if access to a target memory address associated with the memory access request is permitted by a data coherence protocol. If the memory access is permitted, the memory hub can issue the memory access request to the target memory device on behalf of the CPU socket. In some examples, the memory hub can apply QoS priority to memory access requests to prioritize memory access requests with higher priority to provide faster execution than memory access requests with lower priority.

Figures 2, 2C, 3, 4, 5:
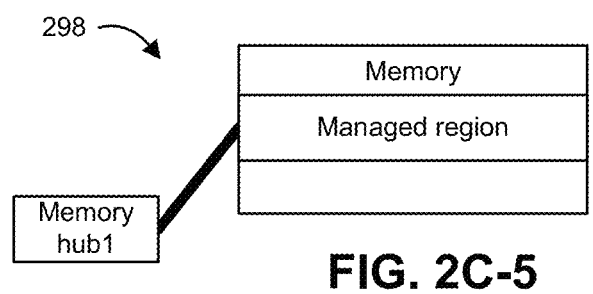

FIG. 5 depicts an example system. Various embodiments can be used by system 500 to provide processors with access to memory devices or storage devices using a memory hub. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that uses higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be fixed function and/or programmable offload engines that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It can be understood that memory controller 522 could be a physical part of processor 510 or a physical part of interface 512. For example, memory controller 522 can be an integrated memory controller, integrated onto a circuit with processor 510.

In some examples, instead of or in addition to use of memory controller 522, interface 512 can issue a memory access request or data consistency request to a memory hub and the memory hub can perform the memory access request or data consistency request on behalf of system 500.

While not specifically illustrated, it can be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include stand-alone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

Some examples of network device 550 are part of an Infrastructure Processing Unit (IPU) or data processing unit (DPU) or utilized by an IPU or DPU. An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514. Various embodiments can use a memory hub to access volatile or non-volatile memory devices.

A volatile memory device includes a memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute systems of processors, memories, storages, network interfaces, and other components. High speed interconnects can be used to access devices such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 6:
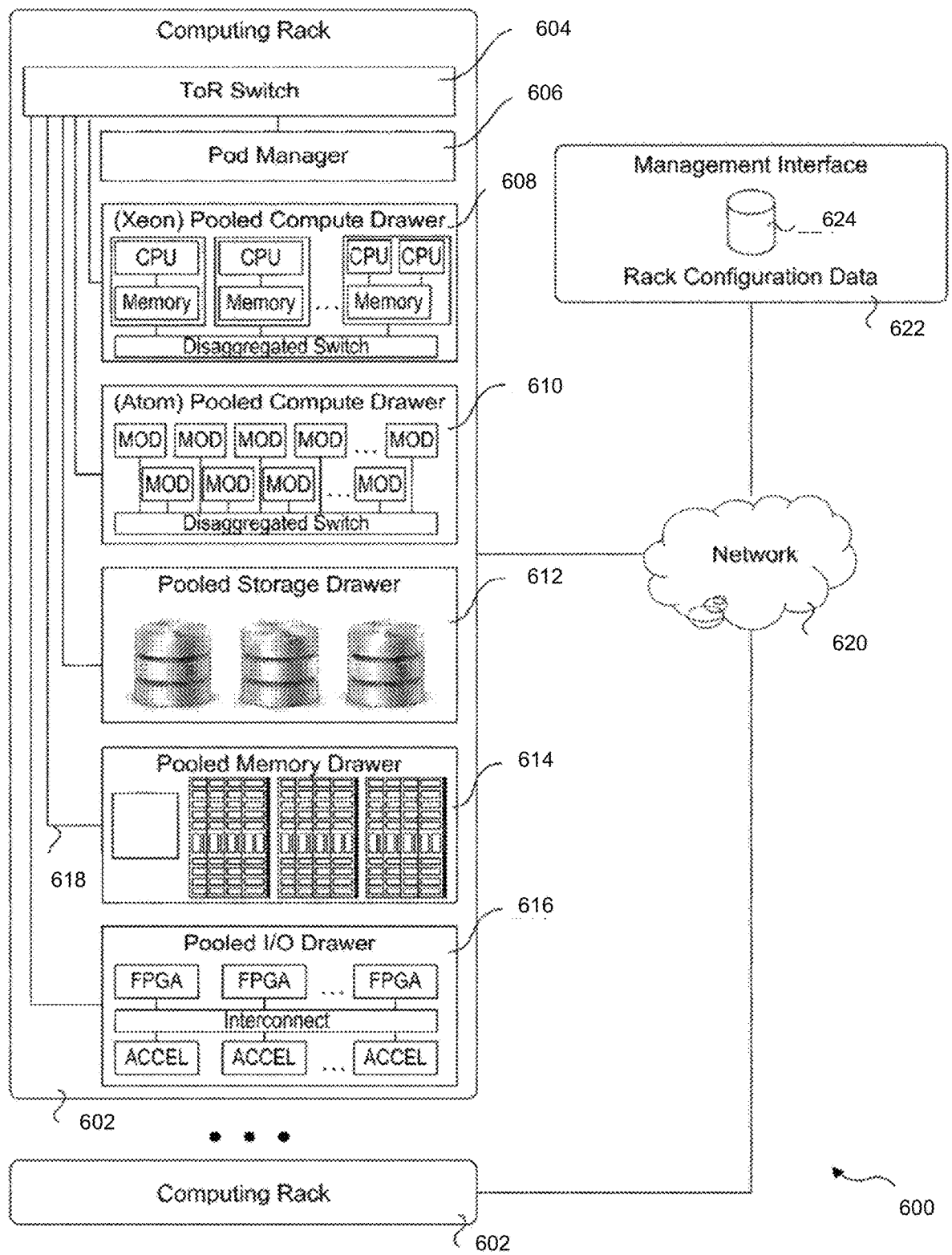
FIG. 6 depicts an example environment.

FIG. 6 depicts an environment 600 includes multiple computing racks 602, one or more including a Top of Rack (ToR) switch 604, a pod manager 606, and a plurality of pooled system drawers. Various embodiments can be used to provide processors with access to memory devices using one or more memory hubs. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 608, and Intel® ATOM™ pooled compute drawer 610, a pooled storage drawer 612, a pooled memory drawer 614, and a pooled I/O drawer 616. Any of the pooled system drawers is connected to ToR switch 604 via a high-speed link 618, such as an Ethernet link or a Silicon Photonics (SiPh) optical link.

Multiple of the computing racks 602 may be interconnected via their ToR switches 604 (e.g., to a pod-level switch or data center switch), as illustrated by connections to a network 620. In some embodiments, groups of computing racks 602 are managed as separate pods via pod manager(s) 606. In one embodiment, a single pod manager is used to manage the racks in the pod. Alternatively, distributed pod managers may be used for pod management operations.

Environment 600 further includes a management interface 622 that is used to manage various aspects of the environment. This includes managing rack configuration, with corresponding parameters stored as rack configuration data 624.

In some examples, embodiments described herein can be used in connection with a base station (e.g., 3G, 4G, 5G, and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus comprising: at least two processing units and a memory hub coupled to the at least two processing units, the memory hub comprising a home agent, wherein: to perform a memory access request involving a memory device, a first processing unit among the at least two processing units is to send the memory access request to the memory hub.

Example 2 includes one or more other examples, wherein: the first processing unit is to offload at least some but not all home agent operations to the home agent of the memory hub.

Example 3 includes one or more other examples, wherein: the first processing unit comprises a second home agent and wherein the second home agent is to perform the at least some but not all home agent operations before the offload of at least some but not all home agent operations to the home agent of the memory hub and based on provision of the at least some but not all home agent operations to be performed by the second home agent, the second home agent is to perform the at least some but not all home agent operations.

Example 4 includes one or more other examples, wherein: the home agent of the memory hub is to maintain cache coherency among the at least two processing units.

Example 5 includes one or more other examples, wherein: the memory hub comprises a memory cache and wherein if the memory access request comprises a data read request and the memory cache includes the requested data, the memory hub is to provide the requested data from the memory cache to the first processing unit.

Example 6 includes one or more other examples, and includes a connector between at least one processing unit of the at least two processing units and the memory hub, wherein the connector comprises one or more of: a board trace, an electrical link, an optical link, or a coaxial cable and wherein the connector comprises a parallel connection or at least one serial lane.

Example 7 includes one or more other examples, wherein: data access times by the first processing unit and a second processing unit among the at least two processing units from a memory device via the memory hub are approximately uniform.

Example 8 includes one or more other examples, wherein: the memory hub is to manage a coherent memory domain for access by two or more processing units among the at least two processing units from one or more memory devices.

Example 9 includes one or more other examples, and includes a server, wherein the server comprises the at least two processing units, wherein a processing unit among the at least two processing units is to execute an application or microservice that causes issuance of the memory access request to the memory hub.

Example 10 includes one or more other examples, wherein: one or more of the at least two processing units comprises one or more of: an XPU, a CPU, and/or an input/output interface.

Example 11 includes one or more other examples, and includes a second memory hub coupled to the at least two processing units, the second memory hub comprising a home agent, wherein: the second memory hub is to perform a second memory access request from a processing unit among the at least two processing units, the second memory access request associated with a memory device coupled to the second memory hub.

Example 12 includes one or more other examples, wherein: the first processing unit is to manage permission to access one or more memory regions of one or more memory devices and the first processing unit is to delegate the management of permission to access the one or more memory regions of the one or more memory devices to the memory hub.

Example 13 includes one or more other examples, wherein: the memory hub is to delegate the management of permission to access the one or memory regions of the one or more memory devices to the second memory hub.

Example 14 includes one or more other examples, and includes a method comprising: a memory hub providing multiple XPUs with approximately uniform access times to multiple memory devices independent from increasing a number of memory channels at an XPU socket to the multiple memory devices.

Example 15 includes one or more other examples, and includes the multiple XPUs accessing a memory device by providing memory access requests to the memory hub.

Example 16 includes one or more other examples, and includes an XPU among the multiple XPUs offloading data consistency determination to the memory hub.

Example 17 includes one or more other examples, wherein the memory hub is to utilize a home agent to maintain data consistency among the multiple XPUs.

Example 18 includes one or more other examples, and includes managing, by the memory hub, a coherent memory domain for access by two or more XPUs among the multiple XPUs from one or more memory devices among the multiple memory devices.

Example 19 includes one or more other examples, and includes a computer-readable medium, comprising instructions stored thereon, that if executed by one or more processors, cause the one or more processors to: cause multiple XPU sockets to send memory access requests to a memory hub, wherein the memory hub provides the multiple XPUs with approximately uniform access times to one or more memory devices.

Example 20 includes one or more other examples, wherein the memory hub is to manage a coherent memory domain for access by the multiple XPUs from the one or more memory devices.

Example 21 includes one or more other examples, wherein the memory hub is to provide a quality of service for memory access requests from the multiple XPUs based on priority of a requester XPU.

Example 22 includes one or more other examples, and includes a system comprising: a first central processing unit (CPU) socket; a second CPU socket; a first memory hub comprising a first home agent; and a second memory hub comprising a second home agent, wherein: the first CPU socket is to issue memory access request to the first memory hub to access a memory device connected to the first memory hub, the first CPU socket is to issue memory access request to the second memory hub to access a second memory device connected to the second memory hub, the second CPU socket is to issue memory access request to the first memory hub to access the memory device connected to the first memory hub, and the second CPU socket is to issue memory access request to the second memory hub to access the second memory device connected to the second memory hub.

Example 23 includes one or more other examples, wherein the first home agent is to perform a cache coherency operation for the first CPU socket.

Example 24 includes one or more other examples, wherein the first CPU socket is to manage permission to access memory regions of one or more memory devices and the first CPU socket is to delegate the management of permission to access memory regions of the one or more memory devices to the first memory hub.

What is claimed is:

1. An apparatus comprising:
   at least two processing units comprising at least two processor sockets and
   a memory hub coupled to the at least two processing units, the memory hub comprising a home agent, wherein:

the home agent of the memory hub is to maintain cache coherency among the at least two processing units, the cache coherency among the at least two processing units comprises access a copy of modified content of a cache line, the at least two processor sockets comprise at least two central processing units (CPUs), the at least two CPUs comprise cores, and to perform a memory access request involving a memory device, a first processing unit among the at least two processing units is to send the memory access request to the memory hub.

2. The apparatus of claim 1, wherein:

the first processing unit is to offload at least some but not all home agent operations to the home agent of the memory hub.

3. The apparatus of claim 2, wherein:

the first processing unit comprises a second home agent and wherein the second home agent is to perform the at least some but not all home agent operations before the offload of at least some but not all home agent operations to the home agent of the memory hub and based on provision of the at least some but not all home agent operations to be performed by the second home agent, the second home agent is to perform the at least some but not all home agent operations.

4. The apparatus of claim 1, wherein the memory hub comprises a memory cache and wherein if the memory access request comprises a data read request and the memory cache includes requested data, the memory hub is to provide the requested data from the memory cache to the first processing unit.

5. The apparatus of claim 1, comprising:

a connector between at least one processing unit of the at least two processing units and the memory hub, wherein the connector comprises one or more of: a board trace, an electrical link, an optical link, or a coaxial cable and wherein the connector comprises a parallel connection or at least one serial lane.

6. The apparatus of claim 1, wherein:

data access times by the first processing unit and a second processing unit among the at least two processing units from a memory device via the memory hub are approximately uniform.

7. The apparatus of claim 1, wherein:

the memory hub is to manage a coherent memory domain for access by two or more processing units among the at least two processing units from one or more memory devices.

8. The apparatus of claim 1, comprising a server, wherein the server comprises the at least two processing units, wherein a processing unit among the at least two processing units is to execute an application or microservice that causes issuance of the memory access request to the memory hub.

9. The apparatus of claim 1, wherein one or more of the at least two processing units comprises one or more of: an XPU, and/or an input/output interface.

10. The apparatus of claim 1, comprising a second memory hub coupled to the at least two processing units, the second memory hub comprising a home agent, wherein:

the second memory hub is to perform a second memory access request from a processing unit among the at least two processing units, the second memory access request associated with a memory device coupled to the second memory hub.

11. The apparatus of claim 1, wherein:

the first processing unit is to manage permission to access one or more memory regions of one or more memory devices and the first processing unit is to delegate the management of permission to access the one or more memory regions of the one or more memory devices to the memory hub.

12. The apparatus of claim 11, comprising a second memory hub, wherein:

the memory hub is to delegate management of permission to access the one or memory regions of the one or more memory devices to the second memory hub.

13. A method comprising:

a memory hub providing multiple processor sockets with approximately uniform access times to multiple memory devices independent from increasing a number of memory channels at a processor socket to the multiple memory devices, wherein:

the memory hub comprises a home agent to maintain cache coherency among the multiple processor sockets, the cache coherency among the multiple processor sockets comprises access a copy of modified content of a cache line, the multiple processor sockets comprise multiple XPUs, and the multiple XPUs comprise multiple cores.

14. The method of claim 13, comprising:

the multiple processor sockets accessing a memory device by providing memory access requests to the memory hub.

15. The method of claim 13, comprising:

a processor socket among the multiple processor sockets offloading data consistency determination to the memory hub.

16. The method of claim 13, comprising:

managing, by the memory hub, a coherent memory domain for access by the multiple processor sockets from one or more memory devices among the multiple memory devices.

17. At least one non-transitory computer-readable medium, comprising instructions stored thereon, that if executed by one or more processors, cause the one or more processors to:

cause multiple processor sockets to send memory access requests to a memory hub, wherein the memory hub provides the multiple processor sockets with approximately uniform access times to one or more memory devices, the memory hub comprises a home agent to maintain cache coherency among the multiple processor sockets, the cache coherency among the multiple processor sockets comprises access a copy of modified content of a cache line, the multiple processor sockets comprise multiple XPUs, and the multiple XPUs comprise multiple cores.

18. The computer-readable medium of claim 17, wherein:

the memory hub is to provide a quality of service for memory access requests from the multiple processor sockets based on priority of a requester processor socket.

19. A system comprising:

a first central processing unit (CPU) socket;

a second CPU socket;

a first memory hub comprising a first home agent; and a second memory hub comprising a second home agent, wherein:

the first home agent of the first memory hub is to maintain cache coherency among the first and second CPU sockets, the cache coherency among the first and second CPU sockets comprises access a copy of modified content of a cache line, the first and second CPU sockets comprise at least one core, the first CPU socket is to issue memory access request to the first memory hub to access a memory device connected to the first memory hub, the first CPU socket is to issue memory access request to the second memory hub to access a second memory device connected to the second memory hub, the second CPU socket is to issue memory access request to the first memory hub to access the memory device connected to the first memory hub, and the second CPU socket is to issue memory access request to the second memory hub to access the second memory device connected to the second memory hub.

20. The system of claim 19, wherein the first home agent is to perform a cache coherency operation for the first CPU socket.

21. The system of claim 19, wherein the first CPU socket is to manage permission to access memory regions of one or more memory devices and the first CPU socket is to delegate the management of permission to access memory regions of the one or more memory devices to the first memory hub.

22. The apparatus of claim 1, comprising:

at least one memory device coupled to the memory hub.

23. The apparatus of claim 1, comprising:

a first processor package for a first processor socket of the at least two processor sockets and a second processor package for a second processor socket of the at least two processor sockets.

24. The computer-readable medium of claim 17, wherein an XPU of the multiple XPUs comprises one or more of: a central processing unit (CPU), a graphics processing unit (GPU), a general purpose GPU (GPGPU), a field programmable gate array (FPGA), cryptographic accelerator, or application specific integrated circuit (ASIC).

\* \* \* \* \*